US011840148B2

(12) United States Patent
Loder et al.

(10) Patent No.: US 11,840,148 B2
(45) Date of Patent: Dec. 12, 2023

(54) HYBRID AIRCRAFT HAVING RECTIFIER WITH INTEGRATED PROTECTION

(71) Applicants: Rolls-Royce Corporation, Indianapolis, IN (US); Rolls-Royce Electrical Norway AS, Trondheim (NO); Rolls-Royce Singapore Pte. Ltd., Singapore (SG)

(72) Inventors: David Loder, Indianapolis, IN (US); David Russell Trawick, Indianapolis, IN (US); Eirik Mathias Husum, Trondheim (NO); Erlend Engevik, Trondheim (NO); Roar Furuhaug, Trondheim (NO); Chandana Jayampathi Gajanayake, Singapore (SG)

(73) Assignees: Rolls-Royce Corporation/Rolls-Royce Singapore Pte. Ltd., Singapore (SG); Rolls-Royce Electrical Norway AS, Trondheim (NO)

( * ) Notice: Subject to any disclaimer, the term of this patent is extended or adjusted under 35 U.S.C. 154(b) by 0 days.

(21) Appl. No.: 17/651,161

(22) Filed: Feb. 15, 2022

(65) Prior Publication Data
US 2023/0256828 A1 Aug. 17, 2023

(51) Int. Cl.
*B60L 3/00* (2019.01)
*B60L 3/04* (2006.01)
(Continued)

(52) U.S. Cl.
CPC ............. *B60L 3/003* (2013.01); *B60L 3/04* (2013.01); *B64D 27/24* (2013.01);
(Continued)

(58) Field of Classification Search
None
See application file for complete search history.

(56) References Cited

U.S. PATENT DOCUMENTS 9,941,772 B2 * 4/2018 Lewis ................... H02J 3/34
11,128,251 B1 9/2021 Solodovnik et al.
(Continued)

OTHER PUBLICATIONS

U.S. Appl. No. 17/651,156, filed Feb. 15, 2022, naming inventors Loder et al . . . .
(Continued)

*Primary Examiner* — Jared Fureman
*Assistant Examiner* — Aqeel H Bukhari
(74) *Attorney, Agent, or Firm* — Shumaker & Sieffert, P.A.

(57) ABSTRACT

A system includes a first generator configured to output a first plurality of AC signals; a second generator configured to output a second plurality of AC signals; a first set of rectifiers configured to convert the first plurality of AC signals into a first plurality of DC signals for output onto a first DC bus, wherein each of the first set of rectifiers includes a respective contactor configured to de-couple a DC output of the respective rectifier from the first DC electrical bus; and a second set of rectifiers configured to convert the second plurality of AC signals into a second plurality of DC signals for output onto a second DC bus, wherein each of the second set of rectifiers includes a respective contactor configured to de-couple a DC output of the respective rectifier from the second DC bus.

14 Claims, 6 Drawing Sheets

(51) Int. Cl.
*B64D 27/24* (2006.01)
*B64D 27/02* (2006.01)

(52) U.S. Cl.
CPC ....... *B60L 2200/10* (2013.01); *B60L 2210/30* (2013.01); *B64D 2027/026* (2013.01)

(56) References Cited

U.S. PATENT DOCUMENTS

| | | |
|---|---|---|
| 2012/0286516 A1 | 11/2012 | Chong et al. |
| 2016/0105056 A1* | 4/2016 | Namurdri ............... B60L 53/22 320/108 |
| 2019/0181786 A1 | 6/2019 | Singh et al. |
| 2020/0131995 A1 | 4/2020 | Trawick |
| 2021/0075331 A1 | 3/2021 | Tariq et al. |
| 2022/0006375 A1* | 1/2022 | Askan .................. H02H 7/1227 |
| 2022/0009643 A1 | 1/2022 | Datta et al. |
| 2022/0219827 A1* | 7/2022 | Knapp .................. B64D 27/24 |

OTHER PUBLICATIONS

U.S. Appl. No. 17/651,177, filed Feb. 15, 2022, naming inventors Loder et al.

\* cited by examiner

| | | Rectifier Fault Responses | | |
|---|---|---|---|---|
| | Fault Detection | Apply three-phase short (to both healthy & faulted stars) | Isolate HVDC Terminals | Halt Active Switching |
| AC Machine Faults | Three-phase short to ground | | X | |
| | Three-phase open | | X | X |
| | Three-phase short | X | X | |
| | Two-phase short to ground | X | X | |
| | Two-phase open | | X | X |
| | Two-phase short | X | X | |
| | One-phase short to ground | | X | X |
| | One-phase open | | X | X |
| | One-phase short (interturn) | X | X | |
| | Star to star fault | X | X | |

HYBRID AIRCRAFT HAVING RECTIFIER WITH INTEGRATED PROTECTION

TECHNICAL FIELD

This disclosure relates to electric machines in hybrid electric aircraft.

BACKGROUND

A hybrid aircraft may include a combustion motor that generates rotational mechanical energy, a generator that converts the rotational mechanical energy into electrical energy, and electrical motors that convert the electrical energy into rotational mechanical energy to drive a propulsor (e.g., fan, propeller, etc.) of the aircraft.

SUMMARY

In one example, a turbo-generator system for generating propulsive electrical power for an aircraft includes an electric machine comprising: a rotor configured to be rotated by a gas-turbine of the turbo-generator system; a stator comprising: a first active section comprising first windings surrounding a first portion of the rotor; and a second active section comprising second windings surrounding a second portion of the rotor.

In another example, a system for providing propulsive electrical power for an aircraft includes a first generator configured to output a first plurality of alternating current (AC) electrical signals; a second generator configured to output a second plurality of AC electrical signals; a first set of rectifiers of a plurality of rectifiers, wherein the first set of rectifiers are configured to convert the first plurality of AC electrical signals into a first plurality of direct current (DC) electrical signals for output onto a first DC electrical bus of a plurality of DC electrical busses, wherein electrical current of the first plurality of DC electrical signals is divided amongst the first set of rectifiers, and wherein each respective rectifier of the first set of rectifiers includes a respective contactor configured to de-couple a DC output of the respective rectifier from the first DC electrical bus; and a second set of rectifiers of the plurality of rectifiers, wherein the second set of rectifiers are configured to convert the second plurality of AC electrical signals into a second plurality of DC electrical signals for output onto a second DC electrical bus of the plurality of DC electrical busses, wherein electrical current of the second plurality of DC electrical signals is divided amongst the second set of rectifiers, and wherein each respective rectifier of the second set of rectifiers includes a respective contactor configured to de-couple a DC output of the respective rectifier from the second DC electrical bus.

In another example, a system for providing propulsive electrical power for an aircraft includes a first generator configured to output a first plurality of AC electrical signals; a second generator configured to output a second plurality of AC electrical signals; a first set of rectifiers of a plurality of rectifiers, wherein the first set of rectifiers are configured to convert the first plurality of AC electrical signals into a first plurality of DC electrical signals for output onto a first DC electrical bus of a plurality of DC electrical busses; and a second set of rectifiers of the plurality of rectifiers, wherein the second set of rectifiers are configured to convert the second plurality of AC electrical signals into a second plurality of DC electrical signals for output onto a second DC electrical bus of the plurality of DC electrical busses, wherein each rectifier of the plurality of rectifiers includes a respective controller of a plurality of controllers, and wherein the plurality of controllers are configured to coordinate response to detected faults.

The details of one or more examples are set forth in the accompanying drawings and the description below. Other features, objects, and advantages will be apparent from the description and drawings, and from the claims.

DETAILED DESCRIPTION

In general, this disclosure is directed to fault tolerant generation of electrical energy. In some scenarios, generation of electrical energy may be a safety critical function. For instance, in the context of hybrid aircraft where electrical energy is used for aircraft propulsion, the generation of electrical energy may fulfill a safety critical function, the failure of which may be classified with major severity in some aircraft (e.g., small fixed wing), and perhaps hazardous or even catastrophic in others (e.g., eVTOL or urban air mobility). Redundant electrical generation sources may be used for safety critical power buses in aircraft. However, full redundancy for propulsive power may not be practical from a weight perspective due to the amount of power required. To reduce weight at the component level and power system level, it may be desirable for the generation system to be high frequency (i.e., high speed) and high voltage, of which there are few to no examples in airborne applications (e.g., that have been certified by regulatory authorities). Power density requirements may necessitate a fine balance between reducing margin in the equipment (e.g., winding temperature vs. insulation limitations) while still maintaining adequate life and reliability. The unique scenario of aircraft operation may result in high operational altitudes. However, operation at high altitudes may place further burden on the insulation system as the breakdown strength of air is reduced at such altitudes, increasing concern for partial discharge or corona. The safety and reliability of newly fielded generation equipment becomes challenging due to the lack of pedigree in the design approaches listed above.

In accordance with one or more aspects of this disclosure, a system that generates electrical energy that is used for propulsion may be made fault tolerant. For instance, the system may be made such that faults may occur without reducing the power output to zero. In this way, the system may tolerate faults while still generating electrical energy, enabling continued propulsion. As such, aspects of this disclosure may improve reliability of an electrical energy generation system without requiring full redundancy (e.g., without requiring a full doubling of components such as a combustion motor).

As one example of how a system may be made fault tolerant, a stator may include multiple active sections surrounding a common rotor. For instance, as opposed to only including a single active section that generates an alternating current (AC) power signal, the stator may include a first active section that generates a first AC power signal and a second active section that generates a second AC power signal. Each of the active sections may include multiple (e.g., two) electrically isolated three-phase winding sets. The system may include multiple rectifiers, with two or more rectifiers for each active section. The rectifiers for a particular active section may covert AC power signals generated by the particular active section into one or more direct current (DC) power signals that are output onto a particular DC electrical bus. As such, the system may include two DC electrical busses that are each independently driven by an active section of a rotor and multiple rectifiers. In this way, the system may tolerate a fault in any one of the active sections or rectifiers and still output electrical energy.

As another example of how a system may be made fault tolerant, rectifiers may include integrated DC fault isolation components. For instance, where a system includes a plurality of rectifiers, each of the plurality of rectifiers may include contactors between an output of a power stage (e.g., an AC/DC converter) of the rectifier and a DC output of the rectifier. A controller of a rectifier may open a contactor of the rectifier in the event of a fault in the rectifier. As the system includes multiple rectifiers, a current load may be distributed amongst the multiple rectifiers. This may reduce the current load flowing through each rectifier, thereby reducing current requirement for the contactors. In this way, this disclosure enables the use of lighter weight and/or more compact contactors. Furthermore, in some examples, a controller of a power stage of a rectifier may be further tasked with control of a contactor of the rectifier, thereby eliminating the need to include an additional contactor controller.

As yet another example of how a system may be made fault tolerant, various rectifiers of a system may perform a coordinated fault response. For instance, where a first rectifier and a second rectifier receive AC outputs from a single generator, the first rectifier and the second rectifier may perform a coordinated response to a fault detected in either of the first rectifier or the second rectifier. As one example, responsive to detecting a fault in the first rectifier, a controller of the first rectifier may apply a three-phase short at the first rectifier (e.g., apply crowbar using switches of the first rectifier) and may further cause a controller of the second rectifier to apply a three-phase short at the second rectifier (e.g., apply crowbar using switches of the second rectifier). By performing such a coordinated response, the rectifiers may mitigate and/or prevent damage to the single generator (e.g., due to heating).

Figure 1:
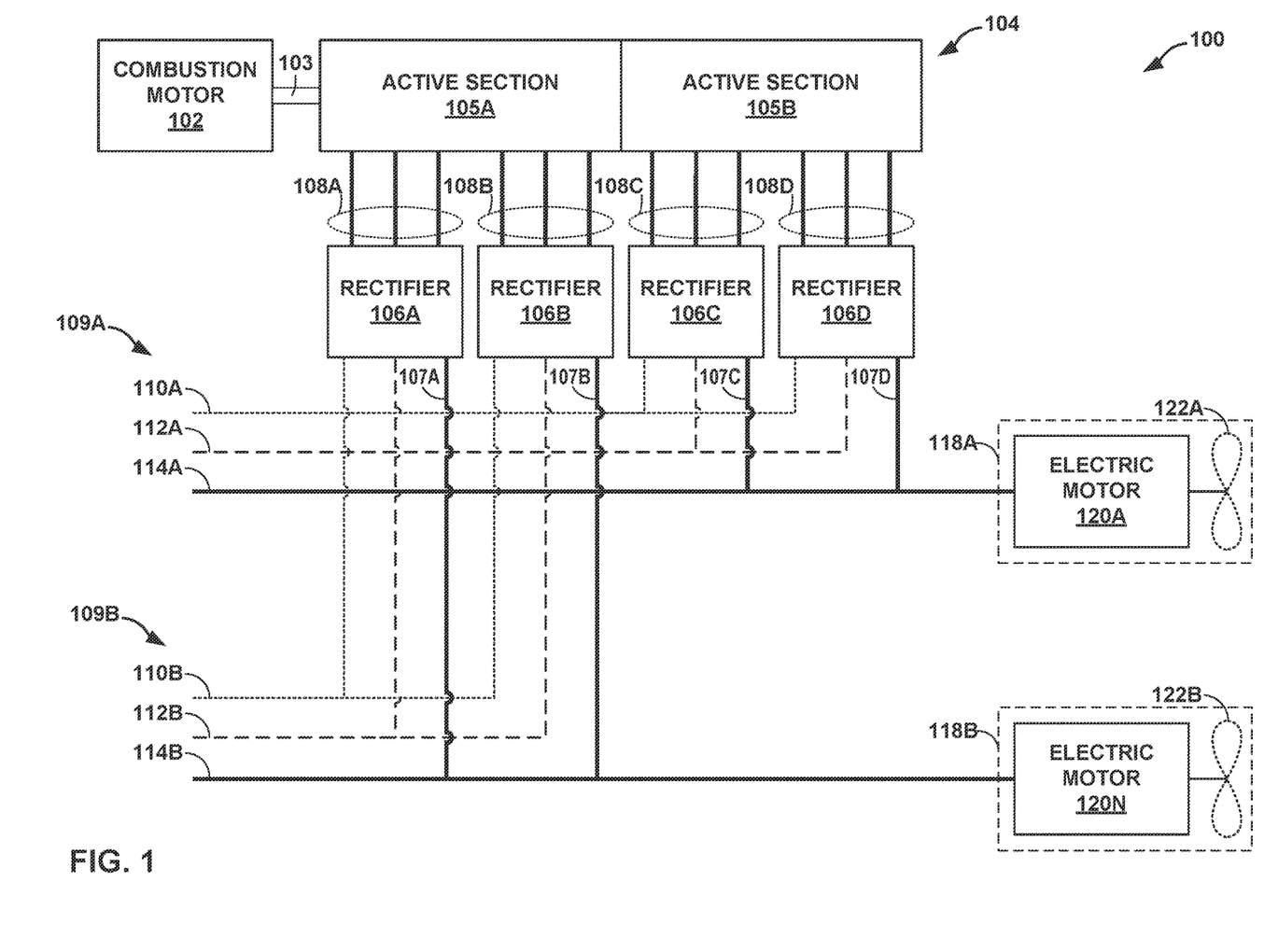
FIG. 1 is a schematic diagram of a system that includes fault tolerant electrical generation, in accordance with one or more aspects of this disclosure.

FIG. 1 is a schematic diagram of a system that includes fault tolerant electrical generation, in accordance with one or more aspects of this disclosure. As shown in FIG. 1, system 100 includes combustion motor 102, generator 104, rectifiers 106A-106D (collectively, "rectifiers 106"), control busses 110A and 110B (collectively, "control busses 110"), low-voltage direct current (DC) busses 112A and 112B (collectively, "LVDC busses 112"), high-voltage DC busses 114A and 114B (collectively, "HVDC busses 114"), propulsion units 118A and 118B (collectively, "propulsion units 118"). System 100 may be included in, and provide propulsion to, any vehicle, such as an aircraft (e.g., fixed wing, tilt rotor, rotorcraft, etc.), a locomotive, or a watercraft. System 100 may include additional components not shown in FIG. 1 or may not include some components shown in FIG. 1. For instance, system 100 may include an electrical energy storage system (ESS) configured to provide electrical energy to various components of system 100.

Combustion motor 102 may consume fuel to produce rotational mechanical energy, which may be provided to generator 104 via drive shaft 103. Combustion motor 102 may be any type of combustion motor. Examples of combustion motor 102 include, but are not limited to, reciprocating, rotary, and gas-turbines.

Generator 104 may convert rotational mechanical energy into electrical energy. For instance, generator 104 may convert rotational mechanical energy derived from combustion motor 102 (e.g., via drive shaft 103) into alternating current (AC) electrical energy. In some examples, generator 104 may include a single active section. For instance, generator 104 may include a single active section with a set of windings surrounding a single rotor, the set of windings outputting AC electrical energy (e.g., three-phase electrical energy). However, in such an arrangement, certain faults may result in a complete loss of electrical power, which may not be desirable.

In accordance with one or more aspects of this disclosure, generator 104 may divided into multiple active sections (e.g., sections that contain electromagnetic elements to produce power), such as active sections 105A and 105B (collectively, "active sections 105"), on a single rotor/shaft. Each of active sections 105 may include a set of windings (e.g., a winding set) that surround the single rotor. For instance, active section 105 may include first windings that surround a first portion of a rotor connected to drive shaft 103 and second windings that surround a second portion of the rotor connected to drive shaft 103 (e.g., displaced along a longitudinal axis of the rotor). Each of active sections 105 may output separate AC power signals of AC power signals 108A-108D (collectively, "AC power signals 108"). Further details of on example of generator 104 are discussed below with reference to FIG. 2.

In some examples, generator 104 may be a permanent magnet (PM) generator. For instance, first active section 105A and second active section 105 may operate as PM generators. In some examples, system 100 may not include a clutch configured to rotationally decouple the rotor of generator 104 from combustion motor 102 (e.g., a gas-turbine). As such, drive shaft 103 may be rotationally locked to the rotor of generator 104.

The first windings and the second windings may each comprise a respective plurality of phase set windings that outputs a respective AC power signal of AC power signals 108. For instance, the first set of windings of active section 105A may include a first plurality of phase set windings including first phase set windings that output AC power signal 108A and second phase set windings that output AC power signal 108B. Similarly, the second set of windings of active section 105B may include a second plurality of phase set windings including third phase set windings that output AC power signal 108C and fourth phase set windings that output AC power signal 108D.

The windings in an active section of active sections 105 may be overlapping, but electrically isolated. For instance, first and second phase set windings may be overlapping and electrically isolated. Similarly, third and fourth phase set windings may be overlapping and electrically isolated. The phase set windings may be made in a manner such that the magnetic coupling between overlapping phase sets is minimized, which may allow rectifiers 106 to each operate independently as discussed below. Further details of one example of how the windings may be arranged are discussed below with reference to FIG. 3.

Rectifiers 106 may be configured to convert AC electrical energy into DC electrical energy. For instance, each of rectifiers 106 may convert a respective input AC power signal of AC power signals 108 into a respective output DC power signal of DC power signals 107A-107D (collectively, "DC power signals 107). As shown in FIG. 1, rectifiers 106 may include multiple rectifiers for each active section of active sections 105, such as a separate rectifier for each phase set of windings. As such, electrical current of an active section may be divided amongst the first set of rectifiers. For instance, rectifiers 106A and 106B may convert AC electrical energy generated by active section 105A (e.g., AC power signals 108A and 108B) into DC electrical energy (e.g., DC power signals 107A and 107B), which may be output onto HVDC bus 114A. In some examples, DC power signals 107A and 107B may be referred to as a first plurality of DC power signals. A total current level of the first plurality of DC power signals (e.g., a combined current of DC power signals 107A and 107B) may be greater than 20 amps, 100 amps, 200 amps, or more). As such, rectifiers 106A and 106B may form a first plurality of rectifiers configured to convert AC electrical energy output by the first plurality of phase set windings (e.g., phase set windings of active section 105A) into first DC electrical energy. Each of rectifiers 106A and 106B may covert power from separate phase set windings of the first plurality of phase set windings. As such, each phase set winding of the first plurality of phase set windings may be driven by an independent rectifier unit. Similarly, rectifiers 106C and 106D may convert AC electrical energy generated by active section 105B (e.g., AC power signals 108C and 108D) into DC electrical energy (e.g., DC power signals 107C and 107D), which may be output onto HVDC bus 114B. As such, rectifiers 106C and 106D may form a second plurality of rectifiers configured to convert AC electrical energy output by the second plurality of phase set windings (e.g., phase set windings of active section 105B) into second DC electrical energy. Each of rectifiers 106C and 106D may covert power from separate phase set windings of the second plurality of phase set windings. As such, each phase set winding of the second plurality of phase set windings may be driven by an independent rectifier unit. Further details of one example of a rectifier of rectifiers 106 are discussed below with reference to FIG. 4.

Propulsion modules 118 may be configured to provide propulsive force (e.g., to propel a vehicle that includes system 100). Each of propulsion modules 118 may include an electric motor of electric motors 120A and 120B and a propulsor (e.g., fan, propeller, etc.) of propulsors 122A and 122B. For instance, propulsion module 118A may include electric motor 120A that rotates propulsor 122A, and propulsion module 118B may include electric motor 120B that rotates propulsor 122B. In some examples, electric motors 120 may include AC electric motors. In such examples, propulsion modules 118A may include inverters configured to convert DC electrical energy (e.g., sourced from HVDC busses 114) into AC electrical energy to drive the AC electric motors.

System 100 may include several electric busses, including control busses 110, LVDC busses 112, and HVDC busses 114. Control busses 110 may be configured to transport data and/or control signals amongst components of system 100. For instance, control busses 110 may transport control signals amongst rectifiers 106. LVDC busses 112 may be configured to provide low voltage DC electrical energy (e.g., 14 volts, 28 volts, 36 volts, 48 volts, etc.) to various components of system 100. For instance, LVDC busses 112 may provide low voltage DC energy to rectifiers 106 (e.g., to operate various components of rectifiers 106, such as controllers and active components). HVDC busses 114 may be configured to transport high voltage DC electrical energy (e.g., 270 volts, 600 volts, 1080 volts, 2160 volts, etc.) to various components of system 100. For instance, HVDC busses 114 may transport high voltage DC electrical energy from rectifiers 106 to propulsion modules 118.

In some cases, such as the example of FIG. 1, the electric busses may be divided into multiple domains 109A and 109B (collectively, "domains 109"), each of domains 109 may include a member of each electric bus. For instance, domain 109A may include control bus 110A, LVDC bus 112A, and HVDC bus 114A; and domain 109B may include control bus 110B, LVDC bus 112B, and HVDC bus 114B.

Components of system 100 may be assigned, and electrically connected to, at least one of the domains. Critical components, such as propulsion modules 118, may be distributed across the domains. For instance, propulsion module 118A may be attached to domain 109A and receive power from HVDC bus 114A (e.g., electric motor 120A may operate using electrical energy sourced from HVDC bus 114A), and propulsion module 118B may be attached to domain 109B and receive power from HVDC bus 114B (e.g., electric motor 120B may operate using electrical energy sourced from HVDC bus 114B). In this way, system 100 may include a plurality of electrical motors 120, a first sub-set of electrical motors 120 (e.g., electrical motor 120A) may provide propulsion (e.g., propel an aircraft that includes system 100) using electrical energy sourced via a first DC electrical bus (e.g., HVDC bus 114A) and a second sub-set of electrical motors 120 (e.g., electrical motor 120B) may provide propulsion (e.g., propel the aircraft that includes system 100) using electrical energy sourced via a second DC electrical bus (e.g., HVDC bus 114B). In this way, critical components attached to a first domain can continue operation even in the event of a complete failure of a second domain. For instance, propulsion module 118B may continue operation (e.g., continue to provide propulsive force for a vehicle that includes system 100) even if a failure occurs in domain 109A that results in no power being output to HVDC bus 114A.

As generator 104 is driven by a prime mover (e.g., combustion motor 102), output power of generator 104 may not be removable by simply halting action of rectifiers 106. It may be desirable for faults internal to machine generator 104 or in connecting AC cables (e.g., cables that transport AC power signals 108) to not pose a safety risk (e.g., by overheating and compromising the insulation or structural integrity of the other segments). For this reason, many auxiliary power units (APU) installed on aircraft use field-wound rotor technology, or in the case of permanent magnet (PM) generators, may include a clutch to disengage driveshaft 103 upon detection of a fault. As PM generators provide weight and efficiency benefits, it may be desirable for generator 104 to be a PM generator. Furthermore, a clutch may not be practical as a single fault in one of active sections 105 would necessitate a total loss of power, which would eliminate some of the advantages of system 100 (e.g., the advantages of including multiple active sections, independent rectifiers, and split HVDC busses). Therefore, parameters of generator 104 may be targeted to produce a short circuit current of a similar magnitude to a nominal current. In this way, a fault in an AC segment (generator winding set, connecting cable set, or rectifier AC input) may persist indefinitely without posing a safety hazard, while the remaining phase sets can continue to produce full power. The windings may be designed such that the windings of one of active section 105 are physically separated from the other (see FIG. 2). Additionally, in some examples, each slot may be filled by a winding of only one phase (see FIG. 2), which may minimize risk of fault occurring between two overlapping winding sets.

As discussed in further detail below, system 100 may react to certain faults by decoupling and/or shutting down one or more of rectifiers 106. A fault in a particular rectifier of rectifiers 106 may only result in a power reduction of 25% (e.g., where rectifiers 106 includes four rectifiers), leaving 75% of power generation capacity remaining. As such, system 100 may be considered to be fault tolerant without having to fully duplicate a generation system.

Figure 2:
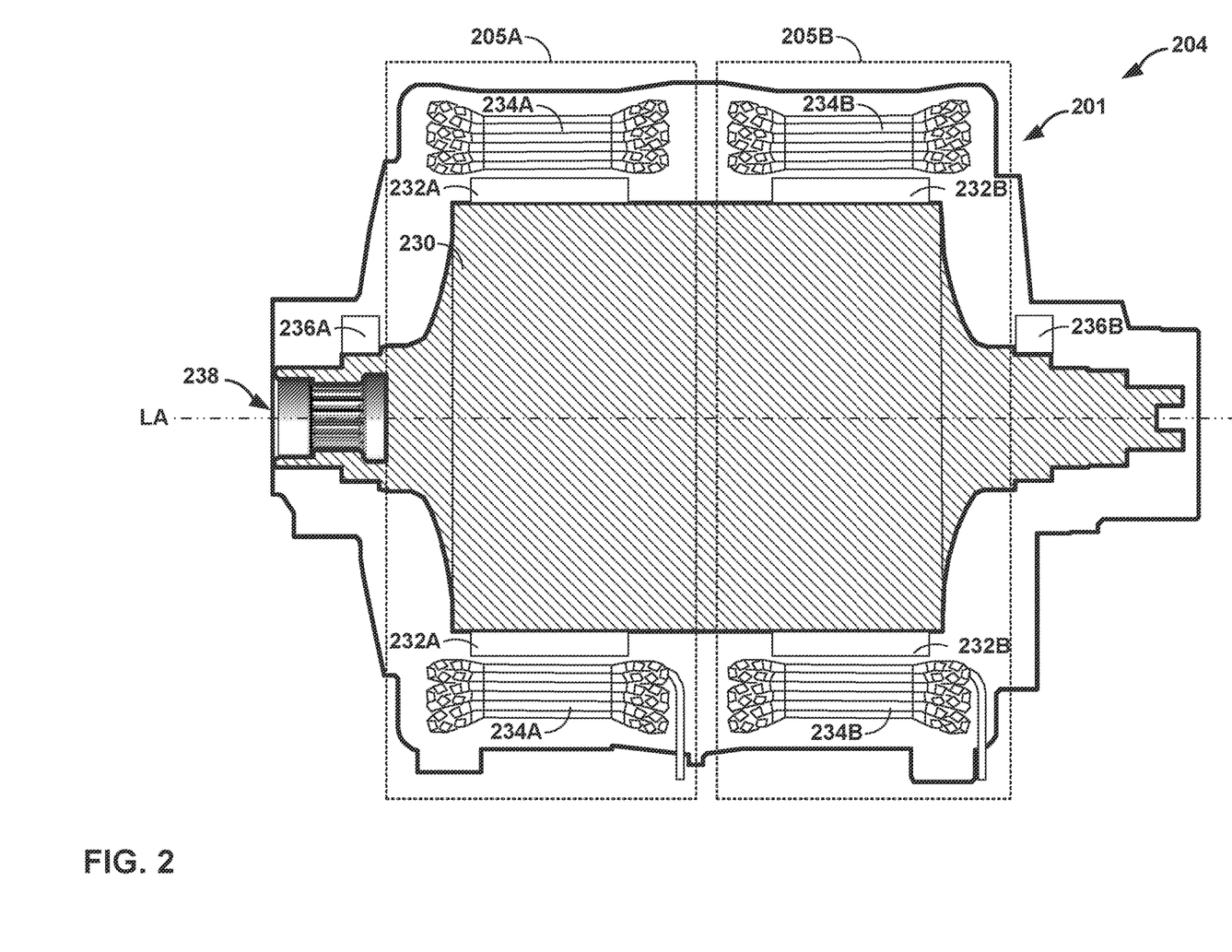
FIG. 2 is a schematic diagram illustrating a cross-section of a generator, in accordance with one or more aspects of this disclosure.

FIG. 2 is a schematic diagram illustrating a cross-section of a generator, in accordance with one or more aspects of this disclosure. Generator 204 of FIG. 2 may be an example of generator 104 of FIG. 1. As shown in FIG. 2, generator 204 may include stator 201 that includes 205 active sections 205A and 205B (collectively, "active sections 205"), rotor 230, and position sensors 236A and 236B (collectively, "position sensors 236"). Active sections 205 of FIG. 2 may be examples of active sections 105 of FIG. 1.

Rotor 230 may be coupled to a combustion motor and may rotate using rotational mechanical energy provided by the combustion motor. For instance, rotor 230 may include attachment portion 238 (illustrated as being splined) that is configured to receive rotational mechanical energy, such as from drive shaft 103 of combustion motor 102 of FIG. 1. Rotor 230 may carry components that, when rotated, result in the generation of electrical power. For instance, rotor 230 may carry magnetic components 232A and 232B (e.g., at or near an outer surface of rotor 230). In some examples, rotor 230 may include a retaining band configured to retain magnetic components 232.

As discussed above, generator 204 may be divided into multiple active sections 205. Each of active sections 205 may be electrically independent, but may utilize common rotor 230. For instance, rotation of magnetic components 232A may generate power in active section 205A and rotation of magnetic components 232B may generate power in active section 205B, but the power generated in active section 205A may be electrically independent of the power generated in active section 205B. In this way, electrical power may be independently generated in multiple active sections without requiring multiple heavy and/or expensive combustion motors.

Each of active sections 205 may include a plurality of phase set windings. For instance, as shown in FIG. 2, active section 205A may include first plurality of phase set windings 234A and active section 205B may include second plurality of phase set windings 234B. Each of active sections 205 may include a respective plurality of slots, which may be occupied by a single-phase set winding. For instance, active section 205A may include a first plurality of slots, and each slot of the first plurality of slots may be occupied by a single-phase set winding of the first plurality of phase set windings. Similarly, active section 205B may include a second plurality of slots, and each slot of the second plurality of slots may be occupied by a single-phase set winding of the second plurality of phase set windings. One example allocation of phase set windings 234A/234B to slots of generator 204 discussed below with reference to FIG. 3.

Position sensors 236 may be configured to output signals that represent a rotational position of rotor 230. In the example of FIG. 2, position sensors 236 may include a separate position sensor for each of active sections 205, each respective position sensor of position sensors 236 providing an indication of the rotational position of rotor 230 to rectifiers handling power output of the respective active section. For instance, position sensor 236A may provide an indication of the rotational position of rotor 230 to rectifiers 106A and 106B of FIG. 1, and position sensor 236B may provide an indication of the rotational position of rotor 230 to rectifiers 106C and 106D of FIG. 1. By utilizing separate position sensors for each active section, fault tolerance may be further improved (e.g., as failure of a position sensor in an active section may not impact operation of other active sections).

In some examples, generator 204 may operate with a position sensorless control method (e.g., rectifiers may be controlled without knowledge of a position of rotor 230). As such, in some examples, generator 204 may omit position sensors 236.

Figure 3:
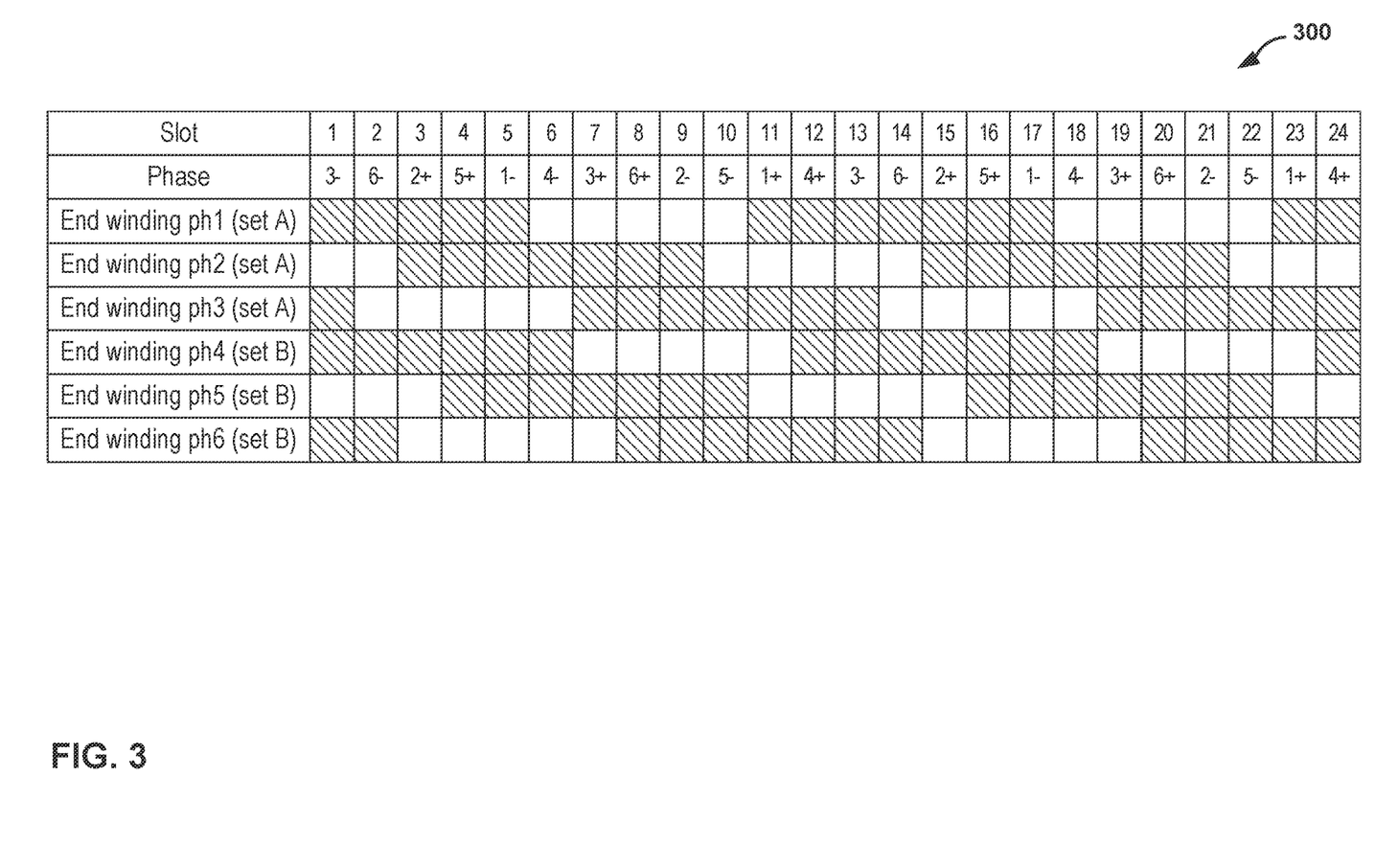
FIG. 3 is a chart illustrating an example arrangement of windings in slots of an active section of a generator, in accordance with one or more aspects of this disclosure.

FIG. 3 is a chart illustrating an example arrangement of windings in slots of an active section of a generator, in accordance with one or more aspects of this disclosure. As discussed above, an active section of a generator, such as active section 105A of generator 104 of FIG. 1, may include a plurality of phase set windings (e.g., set A and set B). The phase set windings may be overlapping. For instance, windings of set A may be overlapping with windings of set B. AC electrical energy generated by each of the plurality of phase set windings may be handled by a separate rectifier. For instance, AC electrical energy generated by set A (e.g., End winding ph1, End winding ph2, End winding ph3) may be converted to DC by a first rectifier, and AC electrical energy generated by set B (e.g., End winding ph4, End winding ph5, End winding ph6) may be converted to DC by a second rectifier. In some examples, each slot of an active section may be occupied (e.g., filled) by a winding of only one phase. Chart 300 of FIG. 3 illustrates one such allocation of windings to slots. By filling slots with windings of only one phase, the risk of fault occurring between two overlapping winding sets may be minimized.

Figure 4:
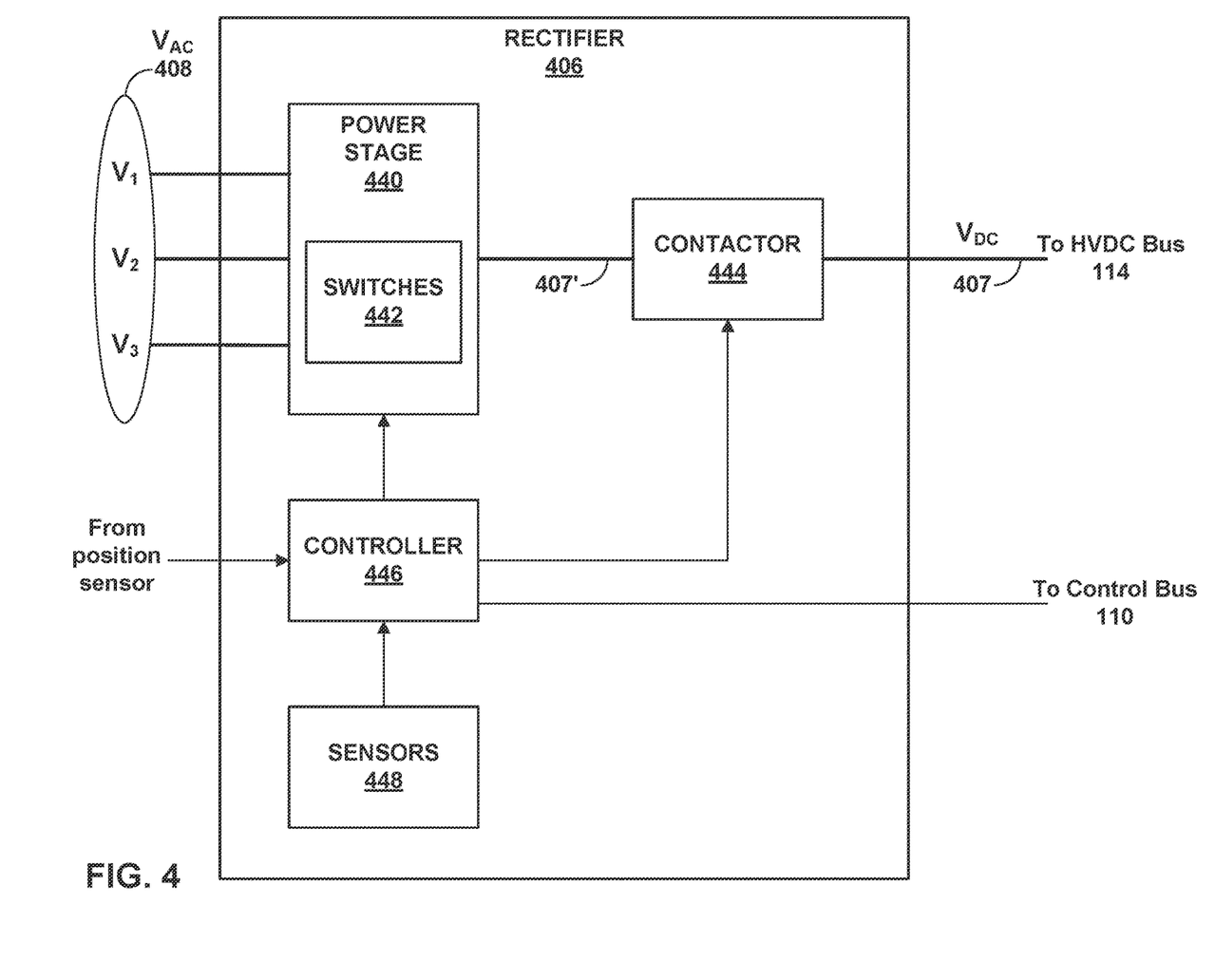
FIG. 4 is a block diagram illustrating a rectifier of a fault tolerant generation system, in accordance with one or more aspects of this disclosure.

FIG. 4 is a block diagram illustrating a rectifier of a fault tolerant generation system, in accordance with one or more aspects of this disclosure. Rectifier 406 of FIG. 4 may be an example of a rectifier of rectifiers 106 of FIG. 1. As shown in FIG. 4, rectifier 406 may include power stage 440, contactor 444, controller 446, and sensors 448.

Power stage 440 may be configured to covert alternating current (AC) electrical energy into direct current (DC) electrical energy. For instance, power stage 440 may convert input AC power signal 408 (e.g., a three-phase AC power signal including phases $V_1$, $V_2$, and $V_3$) into DC power signal 407 ($V_{DC}$) In some examples, power stage 440 may be an active rectifier that includes switches 442, the controlled switching of which may perform the AC/DC conversion. For instance, power stage 440 may be a three-phase active rectifier and switches 442 may be power electronic switches (e.g., either IGBTs with accompanying reverse diode, or MOSFETs) in a "6-pack" configuration.

Controller 446 may perform one or more operations to control functionality of components of rectifier 406. For instance, where power stage 440 is an active rectifier, controller 446 may output signals that control operation of switches 442. Controller 446 may generate the signals that control operation of switches 442 based on various input data. Examples of input data include, but are not necessarily limited to, rotation position data received from a position sensor (e.g., a position sensor of position sensors 236 of FIG. 2), and data received from sensors 448. Controller 446 may be coupled to a control bus, such as a control bus of control busses 110 of FIG. 1. As discussed herein, controller 446 may apply a crowbar using switches 442. For instance, controller 446 may output signals to switches 442 that cause all of switches 442 to close at a particular time, thereby applying a crowbar.

Controller 446 may comprise any suitable arrangement of hardware, software, firmware, or any combination thereof, to perform the techniques attributed to controller 446 herein. Examples of controller 446 include any one or more microprocessors, digital signal processors (DSPs), application specific integrated circuits (ASICs), field programmable gate arrays (FPGAs), or any other equivalent integrated or discrete logic circuitry, as well as any combinations of such components. When controller 446 includes software or firmware, controller 446 further includes any necessary hardware for storing and executing the software or firmware, such as one or more processors or processing units.

In general, a processing unit may include one or more microprocessors, DSPs, ASICs, FPGAs, or any other equivalent integrated or discrete logic circuitry, as well as any combinations of such components. Although not shown in FIG. 4, controller 446 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 446 (e.g., may be external to a package in which controller 446 is housed).

Sensors 448 may be configured to sense various parameters of rectifier 448. Example parameters that may be sensed by sensors 448 include, but are not limited to, input current (e.g., a current of one or more of $V_1$, $V_2$, and $V_3$), input voltage (e.g., a voltage of one or more of $V_1$, $V_2$, and $V_3$), output current (e.g., a current of $V_{DC}$), output voltage (e.g., a voltage of $V_{DC}$), and a temperature of rectifier 406.

As discussed above, switches 442 may be IGBT or MOSFET switches. Both switch types (IGBT and MOSFET) may be considered to be "uni-directional blocking", which means that switches 442 may not be able to be used to block current from flowing into a fault on the HVDC bus. While a fault within one of HVDC busses 114 may lead to 50% power loss, it is desirable for such a fault to not pose a safety hazard (e.g., to an aircraft propelled by system 100). As discussed above, it may not be possible to remove the energy source mechanically or electromagnetically. As such, it may be desirable to include some means to electrically isolate outputs of rectifier 406 from HVDC busses 114. However, breaking a DC fault may be more difficult than breaking an AC fault (e.g., due to the lack of a zero-crossing in the current waveform (upon a zero-crossing in an AC fault, the arc will naturally extinguish)). DC circuit breakers suitable for aerospace applications may not be available above 28V and circuit breakers compatible with the voltage (270 volts, 1 kV or greater) and fault current (e.g., 20 amps, 100 amps, or greater) may not meet weight and environmental tolerance requirements desirable for airborne applications.

In accordance with one or more aspects of this disclosure, rectifier 406 may include contactor 444 that may be configured to electrically de-couple DC output of rectifier 406 from HVDC electrical busses. For instance, when contactor 444 is closed, output of power stage 444 may be electrically coupled to HVDC bus 114 (e.g., such that DC power signal 407' flows through contactor 444 and to HVDC bus 114 as DC power signal 407). However, when contactor 444 is open, output of power stage 444 may be electrically de-coupled from HVDC bus 114 (e.g., such that DC power signal 407' is prevented from flowing through contactor 444 and to HVDC bus 114).

Contactor 444 may be rated to handle a certain current level. Increasing a current level rating of a contactor, such as contactor 444, may result in an increase in size and/or weight of the contactor. As discussed above, electrical current of an active section of a generator may be divided amongst multiple rectifiers. Such an arrangement may reduce an amount of current that flows through each rectifier. For instance, in the example of FIG. 1, 50% of the current generated by active section 105A may flow through each of rectifiers 106A and 106B (e.g., electrical current of a plurality of DC electrical signals generated from a single active section may be divided amongst a set of rectifiers). As such, the fault tolerant generation system of this disclosure may enable use of smaller and/or lighter contactors.

In some examples, operation of contactor 444 may be controlled by controller 446. For instance, controller 446 may selectively output signals that cause contactor 444 to open and close. During normal operation, controller 446 may cause contactor 444 to remain closed (e.g., such that output of power stage 440 is electrically coupled to HVDC bus 114). However, responsive to detection of certain faults, controller 446 may cause contactor 444 to open (e.g., such that output of power stage 440 is electrically de-coupled from HVDC bus 114). By utilizing controller 446 (i.e., a controller already included in rectifier 406) to control operation of contactor 444, inclusion of an additional contactor controller may be avoided. In this way, this disclosure may reduce cost and complexity of a fault tolerant generation system.

In some examples, controller 446 may perform one or more operations to reduce a stress on contactor 444. As one example, controller 446 may time an opening of contactor 444 to coincide with a minimum in the current through contactor 444. As another example, controller 446 may perform a 3 phase short or other action (e.g., via switches 442) to reduce a current through contactor 444 momentarily. As such, controller 446 may provide for a reduction of stress on contactor 444 when contactor 444 opens, thereby increasing a life of contactor 444 and/or enabling use of smaller/lighter/cheaper contactors as contactor 444.

Controller 446 may detect faults based at least in part on data generated by sensors 448. For instance, controller 446 may detect occurrence of a three-phase short fault based at least in part on a voltage or a current measurement sensed by sensors 448. By utilizing sensors 448 (i.e., sensors already included in rectifier 406) to detect fault occurrence, inclusion of redundant sensors may be avoided. In this way, this disclosure may reduce cost and complexity of a fault tolerant generation system.

As discussed above, rectifier 406 may be an example of a rectifier of rectifiers 106 of FIG. 1. It should be understood that each of rectifiers 106 may include components similar to rectifier 406 of FIG. 4. For instance, each respective rectifier of rectifiers 106 may include a respective power stage (including respective switches), a respective contactor, a respective controller, and respective sensors. As such, a first set of rectifiers may include a first set of active rectifiers that convert a first plurality of AC electrical signals into a first plurality of DC electrical signals for output onto a first DC electrical bus of the plurality of DC electrical busses; each of the first set of active rectifiers may include switches; a second set of rectifiers may include a second set of active rectifiers that convert a second plurality of AC electrical signals into a second plurality of DC electrical signals for output onto a second DC electrical bus of the plurality of DC electrical busses; and each of the second set of active rectifiers comprises switches.

In accordance with one or more aspects of this disclosure, controllers of various rectifiers may be configured to perform a coordinated response to certain faults. A metallic retaining band and permanent magnets of a rotor (e.g., of rotor 230 of FIG. 2) may have induced losses when exposed to any non-synchronous magnetic field (i.e., any field seen from the rotor reference frame that is time-varying). The rotor losses may be small in healthy operation. For instance, in normal/healthy operation, the only induced losses may be due to harmonics self-induced by the generator electromagnetic construction, and the harmonics contained within the switching voltage waveform applied by the rectifier. While the rotor losses are manageable in healthy operation, faults that create an unbalanced field may result in excessive heat generation in the rotor, potentially leading to mechanical failure that compromises the entire generator. A two-phase short (i.e., a short between one phase and another winding the winding set, a turn-turn short, and a star-star short (i.e., a short that occurs between two overlapping winding sets), are included in such faults that may cause additional rotor heating (e.g., faults that create an unbalanced field).

In these cases, rectifiers 106 associated with a particular active section of active sections 105 may detect faults and, in a coordinated manner actively apply a three-phase short with rectifiers controlling the affected active section (e.g., coordinate response to detected faults). For instance, rectifiers of rectifiers 106 attached to active section 105A (e.g., rectifiers 106A and 106B) may coordinate response to faults within the rectifiers attached to active section 105A. Similarly, rectifiers of rectifiers 106 attached to active section 105B (e.g., rectifiers 106C and 106D) may coordinate response to faults within the rectifiers attached to active section 105B. In this way, the magnetic field seen by the rotor can be re-balanced to avoid rotor failure.

All rectifiers corresponding to the faulted active section may perform the action in order to minimize the rotor heating by eliminating in addition the normally existing harmonic rotor losses induced by the rectifier. In some examples, the performance of coordinated fault response may be improved by selecting generator parameters to achieve short circuit current achieved by the generator parameters (e.g., which may allow the power electronic switches in the rectifier (e.g., switches 442) to endure an applied three-phase short (the fault current will flow through the rectifier switches) indefinitely without overheating).

Figure 5:
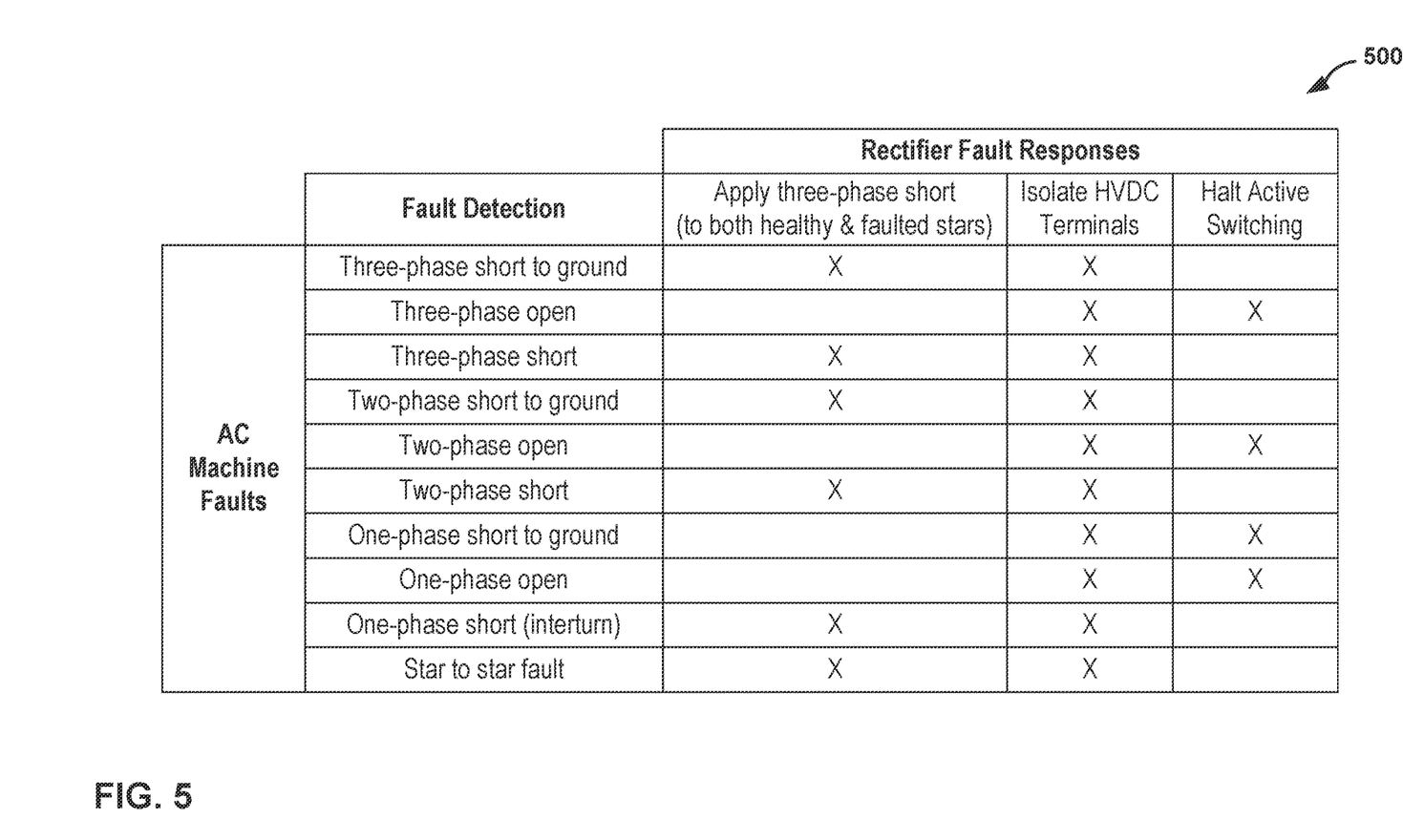
FIG. 5 is a chart illustrating example responses to rectifier faults, in accordance with one or more aspects of this disclosure.

FIG. 5 is a chart illustrating example responses to rectifier faults, in accordance with one or more aspects of this disclosure. The fault responses of table 500 of FIG. 5 may be performed by a controller of a rectifier, such as controller 446 of rectifier 406.

In fault cases where a coordinated response is performed (e.g., faults that create an unbalanced field), the power loss may be 50% (where the generator includes two active sections). In fault cases where a coordinated response is not performed, the power loss may only be 25%. Table 500 illustrates examples of faults for which controllers of rectifiers may perform a coordinated response vs faults for which the controllers may not perform such a coordinated response. As shown in table 500, a controller of a rectifier (e.g., controller 446 of rectifier 406) may perform a coordinated response (e.g., apply three-phase short and cause controllers of other rectifiers attached to the same active section to apply three-phase short) include three-phase short to ground, three-phase short, two-phase short to ground, two-phase short, one-phase short, and star to star fault.

As also shown in table 500, a controller of a rectifier (e.g., controller 446 of rectifier 406) may isolate HVDC terminals for a wide range of faults (e.g., a super set of those faults for which the controller may perform a coordinated response). The controller may isolate the HVDC terminals by causing a contactor within the rectifier to open. For instance, controller 446 may isolate HVDC terminals of rectifier 406 by causing contactor 444 to open.

Figure 6:
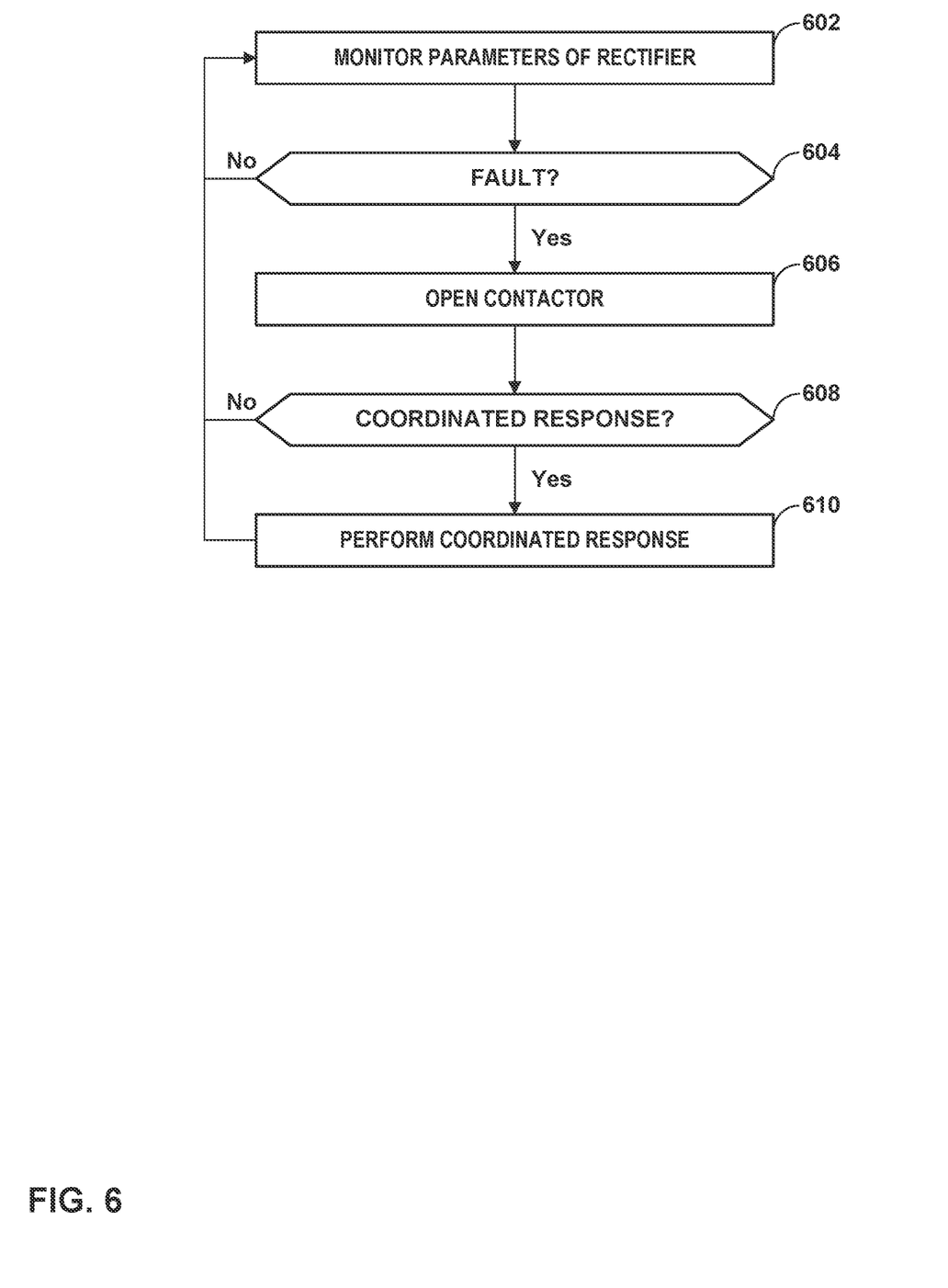
FIG. 6 is a flowchart illustrating an example technique for fault handling in a fault tolerant generation system, in accordance with one or more aspects of this disclosure.

FIG. 6 is a flowchart illustrating an example technique for fault handling in a fault tolerant generation system, in accordance with one or more aspects of this disclosure. The technique of FIG. 6 may be performed by a controller of a rectifier, such as controller 446 of rectifier 406 of FIG. 4.

Controller 446 may monitor one or more parameters of rectifier 406 (602). For instance, controller 446 may receive data from sensors 448 that represents one or more operating parameters of rectifier 406.

Controller 446 may determine whether a fault has occurred (604). For instance, controller 446 may determine, based on the data received from sensors 448, whether a fault has occurred.

Responsive to determining that a fault has occurred ("Yes" branch of 604) controller 446 may determine a response to the fault. For instance, controller 446 may determine a response to the fault based on a type of the determined fault in accordance with table 500 of FIG. 5. As one example, controller 446 may cause a contactor (e.g., contactor 444) of rectifier 406 to open, thereby electrically de-coupling rectifier from a HVDC bus.

In some examples, as discussed above, controller 446 may determine whether to perform a coordinated response to the fault with one or more other rectifiers (608). For instance, where the fault is of a type that will create an unbalanced field in a generator, controller 446 may determine to perform the coordinated response.

Responsive to determining to perform the coordinated response ("Yes" branch of 608), controller 446 may perform the coordinated response. For instance, controller 446 may output a signal to one or more other rectifiers attached to a same active section as rectifier 406 requesting that the one or more other rectifiers apply a three-phase short (e.g., apply crowbar).

The following examples may illustrate one or more aspects of the disclosure:

Example 1A. A turbo-generator system for generating propulsive electrical power for an aircraft, the turbo-generator system comprising: an electric machine comprising: a rotor configured to be rotated by a gas-turbine of the turbo-generator system; a stator comprising: a first active section comprising first windings surrounding a first portion of the rotor; and a second active section comprising second windings surrounding a second portion of the rotor.

Example 2A. The turbo-generator system of example 1A, wherein: the first windings comprise a first plurality of phase set windings; and the second windings comprise a second plurality of phase set windings.

Example 3A. The turbo-generator system of example 2A, further comprising: a first plurality of rectifiers configured to convert alternating current (AC) electrical energy output by the first plurality of phase set windings into first direct current (DC) electrical energy; and a second plurality of rectifiers configured to convert AC electrical energy output by the second plurality of phase set windings into second DC electrical energy.

Example 4A. The turbo-generator system of example 3A, wherein: the first plurality of rectifiers is configured to output the first DC electrical energy onto a first DC electrical bus; and the second plurality of rectifiers is configured to output the second DC electrical energy onto a second DC electrical bus.

Example 5A. The turbo-generator system of example 4A, wherein the aircraft includes a plurality of electrical motors configured to propel the aircraft, wherein a first sub-set of the plurality of electrical motors are configured to propel the aircraft using electrical energy sourced via the first DC electrical bus, and wherein a second sub-set of the plurality of electrical motors are configured to propel the aircraft using electrical energy sourced via the second DC electrical bus.

Example 6A. The turbo-generator system of any of examples 3A-5A, further comprising: a first position sensor configured to output a first indication of a rotational position of the rotor to the first plurality of rectifiers; and a second position sensor configured to output a second indication of the rotational position of the rotor to the second plurality of rectifiers.

Example 7A. The turbo-generator system of any of examples 2A-6A, wherein: the first active section comprises a first plurality of slots, each slot of the first plurality of slots is occupied by a single phase set winding of the first plurality of phase set windings, the second active section comprises a second plurality of slots, and each slot of the second plurality of slots is occupied by a single phase set winding of the second plurality of phase set windings.

Example 8A. The turbo-generator system of any of examples 1A-7A, wherein the first active section operates as a first permanent magnet (PM) generator, and wherein the second active section operates as a second PM generator.

Example 9A. The turbo-generator system of any of examples 1A-8A, wherein the turbo-generator system does not include a clutch configured to rotationally de-couple the rotor from the gas-turbine.

Example 10A. An airframe comprising the turbo-generator system of any of examples 1A-9A.

Example 1B. A system for providing propulsive electrical power for an aircraft, the system comprising: a first generator configured to output a first plurality of alternating current (AC) electrical signals; a second generator configured to output a second plurality of AC electrical signals; a first set of rectifiers of a plurality of rectifiers, wherein the first set of rectifiers are configured to convert the first plurality of AC electrical signals into a first plurality of direct current (DC) electrical signals for output onto a first DC electrical bus of a plurality of DC electrical busses, wherein electrical current of the first plurality of DC electrical signals is divided amongst the first set of rectifiers, and wherein each respective rectifier of the first set of rectifiers includes a respective contactor configured to de-couple a DC output of the respective rectifier from the first DC electrical bus; and a second set of rectifiers of the plurality of rectifiers, wherein the second set of rectifiers are configured to convert the second plurality of AC electrical signals into a second plurality of DC electrical signals for output onto a second DC electrical bus of the plurality of DC electrical busses, wherein electrical current of the second plurality of DC electrical signals is divided amongst the second set of rectifiers, and wherein each respective rectifier of the second set of rectifiers includes a respective contactor configured to de-couple a DC output of the respective rectifier from the second DC electrical bus.

Example 2B. The system of example 1B, wherein each rectifier of the plurality of rectifiers includes: a power stage configured to convert input AC electrical signals to an output DC electrical signal; and a controller configured to control operation of the power stage the rectifier and the contactor of the rectifier.

Example 3B. The system of example 2B, wherein the power stages of the plurality of rectifiers comprise switches, wherein, to control operation of a power stage of a particular rectifier, a controller of the particular rectifier is configured to control operation of switches of the power stage of the particular rectifier.

Example 4B. The system of example 2B or 3B, wherein each rectifier of the plurality of rectifiers further includes: one or more sensors, wherein, to control operation of a power stage of a particular rectifier and a contactor of the particular rectifier, the controller of the particular rectifier is configured to control, based on output generated by one or more sensors of the particular rectifier, operation of the power stage of the particular rectifier and the contactor of the particular rectifier.

Example 5B. The system of any of examples 2B-4B, wherein, to control operation of a contactor of a particular rectifier, the controller of the particular rectifier is configured to cause the contactor of the particular rectifier to open responsive to detecting a fault in the particular rectifier.

Example 6B. The system of any of examples 1B-5B, wherein a voltage level of the plurality of DC electrical busses is greater than 270 volts.

Example 7B. The system of any of examples 1B-5B, wherein total a current level of the first plurality of DC electrical signals is greater than 20 amps.

Example 8B. The system of any of examples 1B-7B, wherein the first and second generator are integrated into a single stator surrounding a single rotor.

Example 9B. The system of any of examples 1B-8B, wherein the aircraft includes a plurality of electrical motors configured to propel the aircraft, wherein a first sub-set of the plurality of electrical motors are configured to propel the aircraft using electrical energy sourced via the first DC electrical bus, and wherein a second sub-set of the plurality of electrical motors are configured to propel the aircraft using electrical energy sourced via the second DC electrical bus.

Example 10B. An airframe comprising the turbo-generator system of any of examples 1B-9B.

Example 11B. A method comprising: monitoring, by a controller of a rectifier of first set of rectifiers attached to an active section of a generator of a system that provides propulsive electrical power for an aircraft, one or more parameters of the rectifier; determining, by the controller and based on the one or more parameters, whether a fault has occurred in the rectifier; and responsive to determining that the fault has occurred in the rectifier, causing a contactor included in the rectifier to de-couple a DC output of the rectifier from a first DC electrical bus.

Example 12B. The method of example 11B, wherein the rectifier is an active rectifier that includes a power stage comprising switches, the method further comprising: controlling, by the controller, the switches.

Example 13B. The method of example 12B, wherein monitoring the one or more parameters of the rectifier comprises: receiving, by the controller, data from one or more sensors of the rectifier, wherein controlling the switches comprises controlling the switches based on the received data, and wherein determining whether the fault has occurred comprises determining whether the fault has occurred based on the received data.

Example 1C. A system for providing propulsive electrical power for an aircraft, the system comprising: a first generator configured to output a first plurality of alternating current (AC) electrical signals; a second generator configured to output a second plurality of AC electrical signals; a first set of rectifiers of a plurality of rectifiers, wherein the first set of rectifiers are configured to convert the first plurality of AC electrical signals into a first plurality of direct current (DC) electrical signals for output onto a first DC electrical bus of a plurality of DC electrical busses; and a second set of rectifiers of the plurality of rectifiers, wherein the second set of rectifiers are configured to convert the second plurality of AC electrical signals into a second plurality of DC electrical signals for output onto a second DC electrical bus of the plurality of DC electrical busses, wherein each rectifier of the plurality of rectifiers includes a respective controller of a plurality of controllers, and wherein the plurality of controllers are configured to coordinate response to detected faults.

Example 2C. The system of example 1C, wherein, to coordinate response to detected faults, the plurality of controllers are configured to separately coordinate response to faults that create an unbalanced field.

Example 3C. The system of example 1C or example 2C, wherein, to coordinate response to detected faults, the plurality of controllers are configured to separately coordinate response to faults detected within the first set of rectifiers and faults detected within the second set of rectifiers.

Example 4C. The system of example 3C, wherein the first set of rectifiers comprise a first set of active rectifiers that convert the first plurality of AC electrical signals into the first plurality of DC electrical signals for output onto the first DC electrical bus of the plurality of DC electrical busses; each of the first set of active rectifiers comprises switches; the second set of rectifiers comprise a second set of active rectifiers that convert the second plurality of AC electrical signals into the second plurality of DC electrical signals for output onto the second DC electrical bus of the plurality of DC electrical busses; and each of the second set of active rectifiers comprises switches.

Example 5C. The system of example 4C, wherein, to separately coordinate response to faults detected within the first set of rectifiers, a controller of a first rectifier of the first set of rectifiers is configured to apply a crowbar using switches of the first rectifier and cause a controller of a second rectifier of the first set of rectifiers to apply a crowbar using switches of the second rectifier.

Example 6C. The system of example 5C, wherein, to separately coordinate response to faults detected within the second set of rectifiers, a controller of a second rectifier of the second set of rectifiers is configured to apply a crowbar using switches of the first rectifier of the second set of rectifiers and cause a controller of a second rectifier of the second set of rectifiers to apply a crowbar using switches of the second rectifier of the second set of rectifiers.

Example 7C. The system of any of examples 2C-6C, wherein faults that create an unbalanced field include one or more of: a three-phase short; a two-phase short; a one-phase short; and a star to star fault.

Example 8C. The system of any of examples 1C-7C, wherein the first and second generator comprise permanent magnet generators.

Example 9C. The system of any of examples 1C-8C, wherein the first and second generator are integrated into a single stator surrounding a single rotor.

Example 10C. The system of any of examples 1C-9C, wherein the aircraft includes a plurality of electrical motors configured to propel the aircraft, wherein a first sub-set of the plurality of electrical motors are configured to propel the aircraft using electrical energy sourced via the first DC electrical bus, and wherein a second sub-set of the plurality of electrical motors are configured to propel the aircraft using electrical energy sourced via the second DC electrical bus.

Example 11C. An airframe comprising the turbo-generator system of any of examples 1C-10C.

Example 12C. A method comprising: monitoring, by a controller of a rectifier of first set of rectifiers attached to an active section of a generator of a system that provides propulsive electrical power for an aircraft, one or more parameters of the rectifier; determining, by the controller and based on the one or more parameters, whether a fault has occurred in the rectifier; responsive to determining that the fault has occurred in the rectifier, determining, by the controller, a response to the fault, wherein determining the response to the fault comprises determining whether to perform a coordinated response to the fault with another rectifier of the first set of rectifiers; and responsive to determining to perform the coordinated response to the fault, performing, by the controller, the coordinated response.

Example 13C. The method of example 12C, wherein determining whether to perform the coordinated response to the fault with the other rectifier of the first set of rectifiers comprises determining to perform the coordinate response responsive to determining that the fault will create an unbalanced field in the generator.

Example 14C. The method of example 12C or example 13C, wherein performing the coordinated response comprises applying a crowbar using switches of the rectifier and causing a crowbar to be applied using switches of the other rectifier.

Example 15C. The method of any of examples 12C-14C, wherein performing the coordinated response comprises performing the coordinated response independently of rectifiers of a second set of rectifiers attached to another active section of the generator.

Various examples have been described. These and other examples are within the scope of the following claims.

What is claimed is:

1. A system for providing propulsive electrical power for an aircraft, the system comprising:
   a first generator configured to output a first plurality of alternating current (AC) electrical signals;
   a second generator configured to output a second plurality of AC electrical signals;
   a first set of rectifiers of a plurality of rectifiers, wherein the first set of rectifiers are configured to convert the first plurality of AC electrical signals into a first plurality of direct current (DC) electrical signals for output onto a first DC electrical bus of a plurality of DC electrical busses, wherein electrical current of the first plurality of DC electrical signals is divided amongst the first set of rectifiers, and wherein each respective rectifier of the first set of rectifiers includes a respective contactor configured to de-couple a DC output of the respective rectifier from the first DC electrical bus; and
   a second set of rectifiers of the plurality of rectifiers, wherein the second set of rectifiers are configured to convert the second plurality of AC electrical signals into a second plurality of DC electrical signals for output onto a second DC electrical bus of the plurality of DC electrical busses, wherein electrical current of the second plurality of DC electrical signals is divided amongst the second set of rectifiers, and wherein each respective rectifier of the second set of rectifiers includes a respective contactor configured to de-couple a DC output of the respective rectifier from the second DC electrical bus.

2. The system of claim 1, wherein each rectifier of the plurality of rectifiers includes:
a power stage configured to convert input AC electrical signals to an output DC electrical signal; and
a controller configured to control operation of the power stage the rectifier and the contactor of the rectifier.

3. The system of claim 2, wherein the power stages of the plurality of rectifiers comprise switches, wherein, to control operation of a power stage of a particular rectifier, a controller of the particular rectifier is configured to control operation of switches of the power stage of the particular rectifier.

4. The system of claim 2, wherein each rectifier of the plurality of rectifiers further includes:
one or more sensors,
wherein, to control operation of a power stage of a particular rectifier and a contactor of the particular rectifier, the controller of the particular rectifier is configured to control, based on output generated by one or more sensors of the particular rectifier, operation of the power stage of the particular rectifier and the contactor of the particular rectifier.

5. The system of claim 2, wherein, to control operation of a contactor of a particular rectifier, the controller of the particular rectifier is configured to cause the contactor of the particular rectifier to open responsive to detecting a fault in the particular rectifier.

6. The system of claim 1, wherein a voltage level of the plurality of DC electrical busses is greater than 270 volts.

7. The system of claim 1, wherein total a current level of the first plurality of DC electrical signals is greater than 20 amps.

8. The system of claim 1, wherein the first and second generator are integrated into a single stator surrounding a single rotor.

9. The system of claim 1, wherein the aircraft includes a plurality of electrical motors configured to propel the aircraft, wherein a first sub-set of the plurality of electrical motors are configured to propel the aircraft using electrical energy sourced via the first DC electrical bus, and wherein a second sub-set of the plurality of electrical motors are configured to propel the aircraft using electrical energy sourced via the second DC electrical bus.

10. A method comprising:
monitoring, by a controller of a rectifier of a first set of rectifiers attached to a generator of a system that provides propulsive electrical power for an aircraft, one or more parameters of the rectifier of the first set of rectifiers, wherein the first set of rectifiers are configured to convert a first plurality of AC electrical signals from the generator into a first plurality of direct current (DC) electrical signals for output onto a first DC electrical bus of a plurality of DC electrical busses, wherein electrical current of the first plurality of DC electrical signals is divided amongst the first set of rectifiers;
determining, by the controller of the rectifier of the first set of rectifiers and based on the one or more parameters of the rectifier of the first set of rectifiers, whether a fault has occurred in the rectifier of the first set of rectifiers;
responsive to determining that the fault has occurred in the rectifier of the first set of rectifiers, causing a contactor included in the rectifier of the first set of rectifiers to de-couple a DC output of the rectifier from the first DC electrical bus;
monitoring, by a controller of a rectifier of a second set of rectifiers attached to the generator, one or more parameters of the rectifier of the second set of rectifiers, wherein the second set of rectifiers are configured to convert a second plurality of AC electrical signals from the generator into a second plurality of DC electrical signals for output onto a second DC electrical bus of the plurality of DC electrical busses, wherein electrical current of the second plurality of DC electrical signals is divided amongst the second set of rectifiers;
determining, by the controller of the rectifier of the second set of rectifiers and based on the one or more parameters of the rectifier of the second set of rectifiers, whether a fault has occurred in the rectifier of the second set of rectifiers; and
responsive to determining that the fault has occurred in the rectifier of the second set of rectifiers, causing a contactor included in the rectifier of the second set of rectifiers to de-couple a DC output of the rectifier from the second DC electrical bus.

11. The method of claim 10, wherein the rectifier of the first set of rectifiers is an active rectifier that includes a power stage comprising switches, the method further comprising:
controlling, by the controller of the rectifier of the first set of rectifiers, the switches.

12. The method of claim 11, wherein monitoring the one or more parameters of the rectifier of the first set of rectifiers comprises:
receiving, by the controller of the rectifier of the first set of rectifiers, data from one or more sensors of the rectifier of the first set of rectifiers,
wherein controlling the switches comprises controlling the switches based on the received data, and wherein determining whether the fault has occurred comprises determining whether the fault has occurred based on the received data.

13. An airframe comprising:
a first generator configured to output a first plurality of alternating current (AC) electrical signals;
a second generator configured to output a second plurality of AC electrical signals;
a first set of rectifiers of a plurality of rectifiers, wherein the first set of rectifiers are configured to convert the first plurality of AC electrical signals into a first plurality of direct current (DC) electrical signals for output onto a first DC electrical bus of a plurality of DC electrical busses, wherein electrical current of the first plurality of DC electrical signals is divided amongst the first set of rectifiers, and wherein each respective rectifier of the first set of rectifiers includes a respective contactor configured to de-couple a DC output of the respective rectifier from the first DC electrical bus; and
a second set of rectifiers of the plurality of rectifiers, wherein the second set of rectifiers are configured to convert the second plurality of AC electrical signals into a second plurality of DC electrical signals for output onto a second DC electrical bus of the plurality of DC electrical busses, wherein electrical current of the second plurality of DC electrical signals is divided amongst the second set of rectifiers, and wherein each respective rectifier of the second set of rectifiers includes a respective contactor configured to de-couple a DC output of the respective rectifier from the second DC electrical bus.

14. The airframe of claim 13, further comprising:
a first propulsion module configured to propel the aircraft using electrical energy sourced via the first DC electrical bus; and
a second propulsion module configured to propel the aircraft using electrical energy sourced via the second DC electrical bus.

\* \* \* \* \*